United States Patent [19]

Kitayama et al.

[11] Patent Number: 4,671,610
[45] Date of Patent: Jun. 9, 1987

[54] COMPOSITE OVERHEAD STRANDED CONDUCTOR

[75] Inventors: Yoshinobu Kitayama; Yasunori Saito, both of Yokohama; Mikihiko Okano, Osaka, all of Japan

[73] Assignee: Sumitomo Electric Industries, Ltd., Osaka, Japan

[21] Appl. No.: 668,202

[22] Filed: Nov. 5, 1984

[30] Foreign Application Priority Data

Nov. 11, 1983 [JP] Japan .................... 58-212982

[51] Int. Cl.$^4$ ............................... G02B 6/44
[52] U.S. Cl. ............... 350/96.23; 350/96.10; 174/70 S
[58] Field of Search .......... 350/96.23; 174/70 S, 174/70 R

[56] References Cited

U.S. PATENT DOCUMENTS

| | | | |
|---|---|---|---|
| 4,235,511 | 11/1980 | Yonechi | 350/96.23 |
| 4,239,336 | 12/1980 | Parfree et al. | 350/96.23 |

FOREIGN PATENT DOCUMENTS

| | | | |
|---|---|---|---|
| 0060061 | 9/1982 | European Pat. Off. | 350/96.23 |
| 0070807 | 5/1980 | Japan | 350/96.23 |
| 0142306 | 11/1980 | Japan | 350/96.23 |
| 0198409 | 12/1982 | Japan | 350/96.23 |

*Primary Examiner*—William L. Sikes
*Assistant Examiner*—Akm E. Ullah
*Attorney, Agent, or Firm*—Cushman, Darby & Cushman

[57] ABSTRACT

An improved composite overhead stranded conductor obtained by providing an optical fiber cable in an overhead power line formed by stranding a plurality of conductors, or in an overhead earth wire which is extended in parallel with such an overhead power line. A spacer having a plurality of axially extending helical grooves formed in an outer surface thereof is positioned within a protective tube. Respective optical fibers and/or optical bundles are received in each of the grooves. Each of the grooves has a width substantially equal to the outer diameter of the optical fiber and/or the optical bundles received therein so that movement of the optical fibers and/or the optical bundles in the grooves in the circumferential direction of the spacer is restricted.

12 Claims, 6 Drawing Figures

COMPOSITE OVERHEAD STRANDED CONDUCTOR

FIELD OF THE INVENTION

The present invention relates to an improved composite overhead stranded conductor obtained by providing an optical fiber cable in an overhead power line formed by stranding a plurality of conductors, or in an overhead earth wire which is extended in parallel with such an overhead power line.

BACKGROUND OF THE INVENTION

Copending U.S. patent application Ser. No. 394,959 (filed on July 2, 1982) now abandoned discloses composite overhead stranded conductor of this type, an example of which is shown in FIG. 1 herein. In FIG. 1, an optical unit 5 is composed of a plurality of optical fibers 2 arranged in a corresponding number of helical grooves 1 formed in the outer surface of an aluminum spacer member 3 surrounded by an outer tube 4 also made of aluminum. The outer surface of the optical unit 5 is surrounded by a stranded conductor layer composed of a plurality of aluminum-clad steel wires 6.

The composite stranded conductor shown in FIG. 1 exhibits an acceptable mechanical strength and excellent protective characteristics against lightning due to the fact that the optical unit 5 is received in the outer tube 4, which performs a protective function.

If the outer diameter of the optical fiber 2 is sufficiently smaller than both the width and depth of the helical groove 1 to be received therein loosely, compression and/or expansion stresses applied thereto are absorbed and/or weakened due to radial movement of the optical fibers 2 in the grooves 1, such as shown by thick arrows in FIG. 2. In the structure shown in FIG. 1, however, if the width of the groove 1 of the spacer 3 is much larger than the diameter of the optical fiber 2, bending and/or compression stresses applied to the composite stranded conductor cause the optical fiber to move not only radially but also circumferentially, resulting in irregular bending of the optical fibers. Accordingly, transmission loss of the optical fiber may increase.

SUMMARY OF THE INVENTION

The present invention resides in a composite overhead stranded conductor developed to resolve the problems inherent in the conventional composite overhead stranded conductor, and is featured by the optical fibers and/or the optical bundles being fittingly received in the helical grooves formed in a spacer, with the width of the helical grooves being substantially the same as the diameter of the optical fibers and/or the optical bundles. In the present specification, the optical bundle is intended to mean an assembly of a plurality of optical fibers which are arranged uniformly along the longitudinal direction. When the diameter is used in connection with the optical bundle, it means the maximum size in the radial direction of the bundle. With such a structure, the freedom of movement of the optical fiber in the grooves is restricted to thereby minimize loss increase caused by the bending. However, all external axial stresses applied to the fibers are absorbed by the radial movement of the fibers. For example, when an expansion stress is applied to the composite stranded conductor of the invention while the optical fibers are positioned at the bottoms of the grooves, the diameter of the spacer is reduced and the stress is absorbed by the radial movement of the fibers because the spacer itself is elongated.

It is preferred to round the bottoms of the grooves with a radius of curvature substantially equal to the radius of the optical fibers and/or the optical bundles, thereby preventing microbending of the optical fiber. When the radius is used in connection with the optical bundle, it is a half of its diameter which is defined in the above. Further, in such a case, if the optical fiber has a jacket coating of an elastic material such as silicon, the effect of stress absorption may be improved.

Moreover, since it is possible to make the narrowed grooves of the spacer deeper than the grooves in the spacer shown in FIG. 1, the optical fibers can be moved radially through a distance larger than is possible in the structure of FIG. 1.

Alternatively, the spacer itself can be thinned. This is advantageous when the composite overhead stranded conductor is to be used as a substitute for an existing stranded conductor not having optical fibers therein, in which application the size and weight of the composite overhead stranded conductor must be nearly the same as the existing stranded conductor. The diameter of the spacer should not be larger than twice the diameter of each of the aluminum-clad steel wire which form the outer layer of the stranded conductor.

DETAILED DESCRIPTION OF THE DRAWINGS

Figure 3:
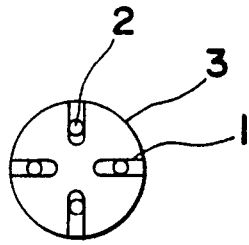
FIG. 3 is a similar view of a spacer used in the present invention.

FIG. 3 is a cross-sectional view of a spacer adapted for use with the present invention. In FIG. 3, the spacer 3 is made of a metal or a heat resistant plastics material, and is formed on its outer periphery with a plurality (four in this case) of helical grooves in which respective optical fibers and/or respective optical bundles 2 are received. The width of each helical groove 1 is made substantially equal to the outer diameter of the optical fiber and/or the optical bundles 2 received therein so that the latter can move only radially.

Figure 4:
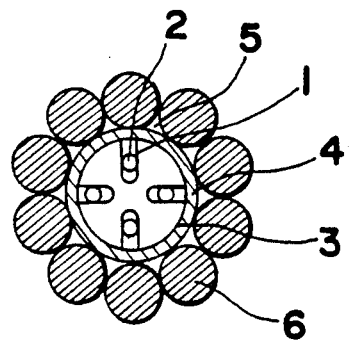
FIG. 4 is a cross-sectional view of a composite overhead stranded conductor of the present invention.
Figure 2:
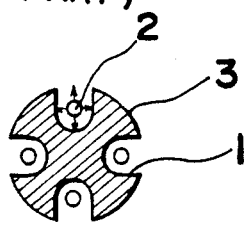
FIG. 2 is an elongated cross-sectional view of a spacer used in the composite stranded conductor of FIG. 1.

FIG. 4 is a cross-sectional view of a composite stranded conductor to which the spacer 3 shown in FIG. 3 is applied. In FIG. 4, the spacer 3, as above, is made of a metal or a heat resistant plastics material and is formed in the outer surface thereof with helical grooves 1, each having a width substantially equal to the diameter of the optical fiber and/or the optical bundles 2 received therein. The spacer 3 is covered by an aluminum tube 4 to form an optical unit 5 surrounded by stranded aluminum-clad steel wires 6.

Figure 1:
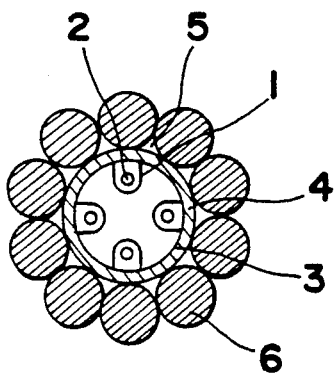
FIG. 1 is a cross-sectional view of a conventional composite stranded conductor.

It is possible to deepen the grooves without reducing the mechanical strength of the spacer. This is one of advantages of the present invention over the conventional stranded conductor shown in FIG. 1. Further, it is possible to coat the surfaces of the grooves 1 and/or the surfaces of the optical fibers with a jelly-like material to damp the relative movement of the optical fibers with respect to the groove walls. Still further, it is possible to employ an elastic material such as silicon resin or silicon rubber in the grooves to elastically restrict the relative movement of the optical fibers with respect to the groove walls so that the optical fibers move together with the spacer 3 in response to thermal and mechanical stresses exerted thereon. In this case, any distortion applied to the optical fibers is made axially uniform so that the lifetime of the optical fibers and the stability of their transmission characteristics are improved.

If the spacer 3 is made of a metal material having an appreciable electrical resistivity, it is possible to restrict a temperature increase due to a lightning strike or a short circuit of the power transmission line. For example, for a composite stranded conductor provided with a spacer 3 made of an aluminum alloy having the same structure as that shown in FIG. 4, an optical unit 5 covered with aluminum tube 4 which is 5 mm diameter, and seven aluminum-clad stranded steel wires 6 each 3.8 mm diameter arranged around the optical unit 5, if the electric resistance per unit length and the cross-sectional area of the composite cable are 0.550 ohms/km and about 80 mm$^2$, respectively, the temperature increase of the conductor due to a short-circuit current is lower by about 30° C. than that of a conductor of a composite stranded conductor with a non-metallic spacer or without such a spacer. For example, the approximate temperature increases of the conductor of the composite stranded conductor with a non-metallic spacer or without such a spacer for a current flow of 20 KA for 0.15, 0.20 and 0.30 seconds are 180° C., 230° C. and 350° C., respectively, while, for the composite stranded conductor constituted with a spacer 3 of an aluminum alloy, the corresponding values are 150° C., 200° C. and 300° C., respectively.

Further, in FIG. 4, either or both of the spacer 3 and the tube 4 can be made of heat durable plastics material. However, if the spacer 3 is made of a metal and the tube 4 of a heat durable plastics material or both of the spacer and the tube are made of metal with an insulating material such as a plastic tape layer between the spacer and the tube, due to the presence of the insulating material layer between the metal spacer 3 and the aluminum-clad steel wires 6, when a short-circuit current flows therethrough, breakdown of the insulating layer is caused and the tube in broken. Thus, the tolerance of the composite stranded conductor to short-circuit currents is low. For example, for the described composite stranded conductor having a cross-sectional area of 80 mm$^2$, it has not been observed that the tube 4 melted even when a short-circuit current of 20 KA flowed for 20 cycles (1 cycle = 1/60 seconds). On the other hand, for a composite stranded conductor which included a Mylar (trademark of Du Pont) tape layer 0.02 mm thick between the spacer 3 and the aluminum tube 4, the latter was melted due to insulation breakdown when a short-circuit current of 15 KA flowed for a period corresponding to 8 cycles.

Figure 5:
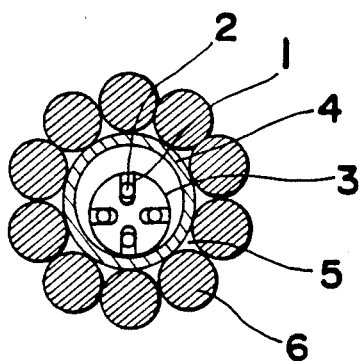
FIG. 5 is a cross-sectional view of another embodiment of the present invention.

FIG. 5 shows another embodiment of the present invention in which the diameter of the spacer 3 is made smaller than the inner diameter of the tube 4 so that the spacer can moved within the tube 4. The structure shown in FIG. 5 is advantageous in case the optical fibers 2 break. That is, the optical fibers 2 received in the spacer 3 can be moved together with the spacer 3 with respect to the tube 4 so that repair of the broken fibers is made possible. For instance, in a test, a force required for extracting or inserting a spacer 2.5 mm diameter and 1 km long from or into an aluminum tube whose inner diameter and length were 4 mm and 1 km, respectively, was 50 kg or less.

Figure 6:
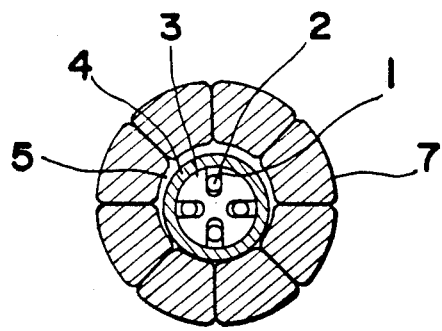
FIG. 6 is a cross-sectional view of a further embodiment of the present invention.

FIG. 6 shows another embodiment of the present invention, in which, instead of aluminum-clad steel wires each having a circular cross section, aluminum-coated steel wires 7 having fan-shaped cross sections are used. The cross sections of the aluminum-coated steel wires 7 are substantially wedge shaped so that adjacent ones of the steel wires 7 are intimately contacted with each other to provide a so-called bridge effect, thereby to make the layer of steel wires rigid. In this embodiment, the tube 4 of the spacer 3 undergoes little deformation. Even if it is deformed, the optical unit 5 is protected by the spacer 3, and therefore it is possible to replace the optical unit 5 without damage to its components.

As described in detail hereinbefore, since the optical fibers are received in helical grooves formed in the spacer with the width of the helical grooves being substantially equal to the outer diameter of the optical fibers and/or the optical bundles, the freedom of movement of the optical fibers in the grooves is reduced, and thus the bending losses thereof are minimized. Further, external stress applied axially to the composite stranded conductor is absorbed by radial movements of the optical fibers. Since the optical fibers always move together with the spacer, the optical fibers are not subjected to local concentration of deformation due to thermal and/or mechanical forces applied thereto externally, resulting in a stable transmission characteristics and extended life time of the optical fibers.

In addition, if the optical fiber has a core and/or a cladding which contains fluorine, the transmission characteristics of the optical fiber in the composite stranded conductor can be stably maintained even under high temperature conditions.

What is claimed is:

1. A composite overhead stranded conductor comprising:
   a plurality of optical fibers;
   a protective tube enclosing said optical fibers;
   a plurality of stranded conductors of metal or metal alloy disposed around said protective tube; and
   a spacer received in said protective tube, said spacer having a plurality of axially extending helical grooves formed in an outer surface of said spacer, said optical fibers being received in respective said grooves, each of said helical grooves having a width substantially equal to an outer diameter of said optical fibers received therein, whereby said optical fibers are restricted from movement in said grooves in a circumferential direction of said spacer.

2. The composite overhead stranded conductor as claimed in claim 1, wherein said spacer is made of a metal.

3. The composite overhead stranded conductor as claimed in claim 1, wherein said spacer is made of a heat-resistant plastics material.

4. The composite overhead stranded conductor as claimed in claim 1, wherein said protective tube is made of a metal.

5. The composite overhead stranded conductor as claimed in claim 1, wherein an inner diameter of said protective tube is substantially equal to an outer diameter of said spacer.

6. The composite overhead stranded conductor as claimed in claim 1, wherein an inner diameter of said protective tube is larger than an outer diameter of said spacer.

7. The composite overhead stranded conductor as claimed in claim 5, wherein each of said stranded conductors is an aluminum-clad steel wire strand, and wherein said aluminum-clad steel wire strands are substantially wedge shaped in cross section so that adjacent ones of said aluminum-clad steel wire strands are intimately contacted with each other to provide a bridge effect.

8. The composite overhead stranded conductor as claimed in claim 6, wherein each of said stranded conductors is an aluminum-clad steel wire strand, and wherein said aluminum-clad steel wire strands are substantially wedge shaped in cross section so that adjacent ones of said aluminum-clad steel wire strands are intimately contacted with each other to provide a bridge effect.

9. The composite overhead stranded conductor as claimed in claim 5, wherein the outer diameter of said spacer is equal to or smaller than twice the outer diameter of any one of said aluminum-clad steel wire strands.

10. The composite overhead stranded conductor as claimed in claim 6, wherein the outer diameter of said spacer is equal to or smaller than twice the outer diameter of any one of said aluminum-clad steel wire strands.

11. The composite overhead stranded conductor as claimed in claim 1, wherein each of said grooves has a rounded bottom portion having a radius of curvature substantially equal to a radius of said one of said optical fibers or said optical bundles received therein.

12. The composite overhead stranded conductor as claimed in claim 1, wherein each of said grooves has a rounded bottom portion having a radius of curvature substantially equal to a radius of said one of said optical fibers and said optical bundles received therein.

* * * * *